(12) United States Patent  (10) Patent No.: US 6,552,847 B2
Congard  (45) Date of Patent: Apr. 22, 2003

(54) PROJECTION SCREEN OF RETRACTABLE TYPE

(75) Inventor: Patrice Bernard François Congard, Paris (FR)

(73) Assignee: Advance Engineering (FR)

( * ) Notice: Subject to any disclaimer, the term of this patent is extended or adjusted under 35 U.S.C. 154(b) by 0 days.

(21) Appl. No.: 09/875,585

(22) Filed: Jun. 6, 2001

(65) Prior Publication Data

US 2002/0051289 A1 May 2, 2002

(30) Foreign Application Priority Data

Jun. 8, 2000 (FR) .............................. 00 07372

(51) Int. Cl.⁷ .............................................. G03B 21/56
(52) U.S. Cl. ...................... 359/445; 359/444; 359/461
(58) Field of Search ............................. 359/445, 461, 359/443, 444

(56) References Cited

U.S. PATENT DOCUMENTS

| 3,568,751 | A | * | 3/1971 | Takahashi | 160/238 |
| 3,692,384 | A | | 9/1972 | Kimura et al. | 359/445 |
| 4,169,658 | A | | 10/1979 | Brown | 359/444 |
| 5,139,069 | A | * | 8/1992 | Hong | 160/84.04 |
| 5,140,460 | A | * | 8/1992 | Fukuhara et al. | 359/445 |
| 5,510,862 | A | | 4/1996 | Liberman et al. | 353/119 |
| 6,052,227 | A | * | 4/2000 | Niwa et al. | 359/461 |

* cited by examiner

Primary Examiner—Russell Adams
Assistant Examiner—Magda Cruz
(74) Attorney, Agent, or Firm—VanOphem & VanOphem, P.C.

(57) ABSTRACT

A projection screen apparatus for reproducing the coherence between a visual image and associated acoustic signals. The projection screen apparatus includes a sound broadcasting device and screen that is transparent to sound waves disposed between the sound broadcasting device and the audience, whereby the projection of video and sound broadcasting are simultaneously implemented with respect to the audience. The screen includes multiple layers of white fabric that are superimposed and joined together such that the screen provides a surface that is both transparent to sound and sufficiently opaque to view a projected image.

15 Claims, 6 Drawing Sheets

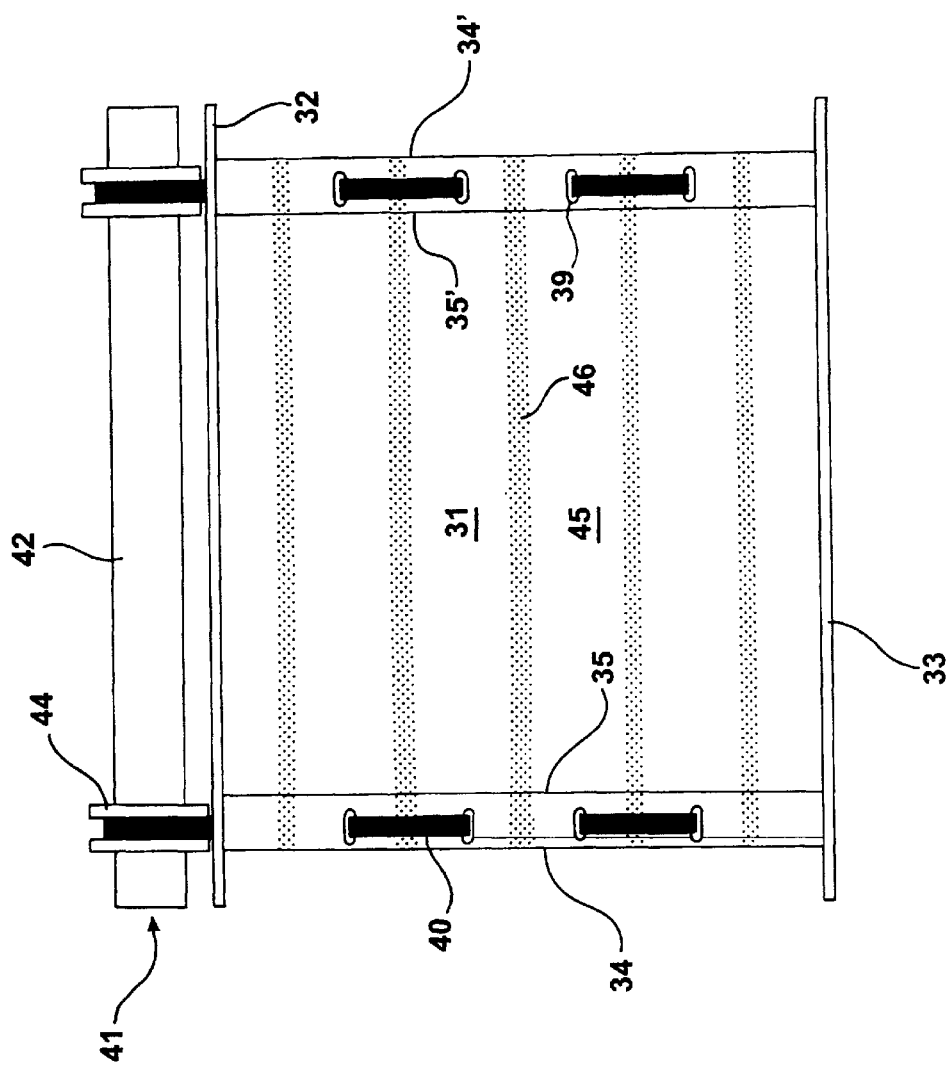
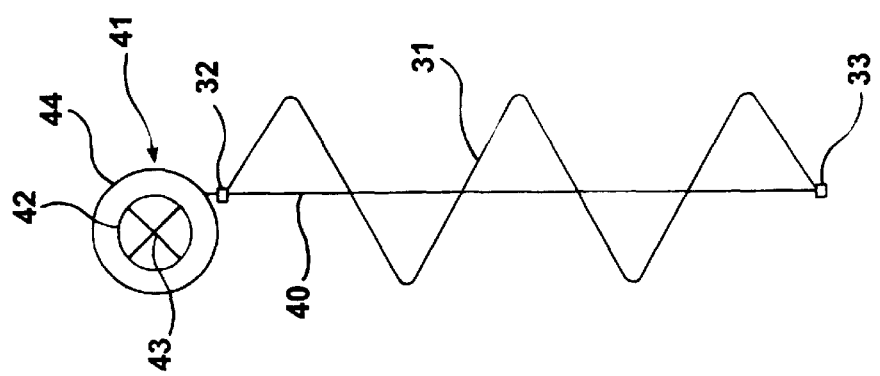
Fig. 6
Fig. 5

PROJECTION SCREEN OF RETRACTABLE TYPE

CROSS-REFERENCES TO RELATED APPLICATIONS

This application claims the benefit of French Application No. 00 07372 filed Jun. 8, 2000.

BACKGROUND OF THE INVENTION

FIELD OF THE INVENTION

The present invention relates to a projection screen of retractable type, adapted to be used in an extended position in combination with a projector, in particular a video projector, and with a sound broadcasting device.

More precisely, a screen according to the present invention is retracted when not in use, in order both to make it less cumbersome and to avoid the risk of its becoming dirtied and/or deteriorated.

Furthermore, a screen according to the present invention is of the type known as acoustically transparent, which is to say that it is permeable to sound waves.

This makes it possible to implement simultaneously the projection of video together with sound broadcasting coming from sound sources placed behind the acoustically transparent screen.

The advantage of placing the sound sources behind the screen has been known since the existence of film with sound, known as "talking pictures". This is to procure the sensation of coherence between the projected image and the sound diffused for the spectator.

The simultaneous implementation of sound sources and an acoustically transparent video screen makes it possible to reproduce this sensation in a smaller environment, in particular a domestic environment.

Video screens combining the features mentioned above are known. Conventionally, such screens are formed from a sheet of plastics material, generally PVC, perforated with orifices of small size adapted to let through sound waves.

Such screens are formed from a sheet of PVC of which the perforations typically represent between 2% and 6% of their surface and let the sound through only very imperfectly. A large part of the sound is reflected, instead of passing though the orifices that perforate the screen. This phenomenon causes substantial attenuation of the sound level, particularly at high frequencies. Furthermore, the multiple reflections created initially by the full portions of the screen cause aberrations in the acoustic response, resulting in irregularities in the transfer function and in distortions that degrade the sound quality.

In addition, in an environment that is more restricted than a conventional movie theater, the spectator is normally placed much closer to the screen. The perforations of the screen, closer than a certain distance, become visible, and add a raster effect to the image that is bothersome.

Such screens are in general retractable through rolling onto a cylinder rotated by a motor, and frequent repetition of this operation gives rise to deformation either on the edges of the screen, or on the median part. This arises from the fact that screens that can be rolled up are not generally tensioned by the edges, but only by a weighting bar, that applies a vertical stretching force to the screen, towards the bottom. With time, the material making up the screen can stretch in an uneven manner, thereby giving rise to deformations that risk impairing the flatness of the screen. Apart from the aesthetic drawbacks that this implies, the focusing of the projector is altered, thereby altering the quality of the image in certain zones. This defect is worse if acoustically transparent screens having perforations are used.

Many devices exist for tensioning the edges of screens that roll up, but they are generally both costly and unaesthetic, and can also jam due to wear. The object of the present invention is to provide an acoustically transparent retractable screen without the drawbacks mentioned above.

BRIEF SUMMARY OF THE INVENTION

The present invention relates to a retractable projection screen that is transparent to sound waves that has at least two layers of white fabric superimposed and joined together.

According to a first embodiment of the present invention, the screen with at least two layers of superimposed fabric is rolled onto a rolling-up device having a weighting bar which is of sufficient weight for stretching the fabric so that the stretching compensates for the difference in diameter between the two layers when they are rolled up.

This makes it possible to avoid the formation of a fold in the inner layer of fabric, when the screen is rolled up.

According to a second embodiment of the present invention, the screen folds into a plurality of rectangles linked by folds when the weighting bar rises under the effect of traction devices that are applied to it.

According to a third embodiment of the present invention, a piece of fabric forming the screen is fixed by one edge defining a first end, an opposite end being affixed to a rolling-up device having a roller disposed in a fixed manner parallel to the first end, a mobile roller serving as a weighting bar being interposed between the two ends so as to tension the fabric towards the bottom by gravity. The roller is fixed to pressing members that tend to make contact between two layers of fabric which are thus disposed back to back.

Preferably the rolling-up device enables the simultaneous retraction of a sound broadcasting device in such a manner that the device is situated substantially at mid-height behind the screen when the latter is in the extended position.

The features and advantages of the present invention will be better understood after reading the following detailed description with reference to the accompanying drawings.

BRIEF DESCRIPTION OF THE SEVERAL VIEWS OF THE DRAWINGS

FIG. 5 is a cross-sectional view of a screen according to a second embodiment of the present invention, the screen being in the unrolled position;

FIG. 6 is a front elevational view of a screen according to the second embodiment of the present invention;

DETAILED DESCRIPTION OF THE PREFERRED EMBODIMENT

Figure 1:
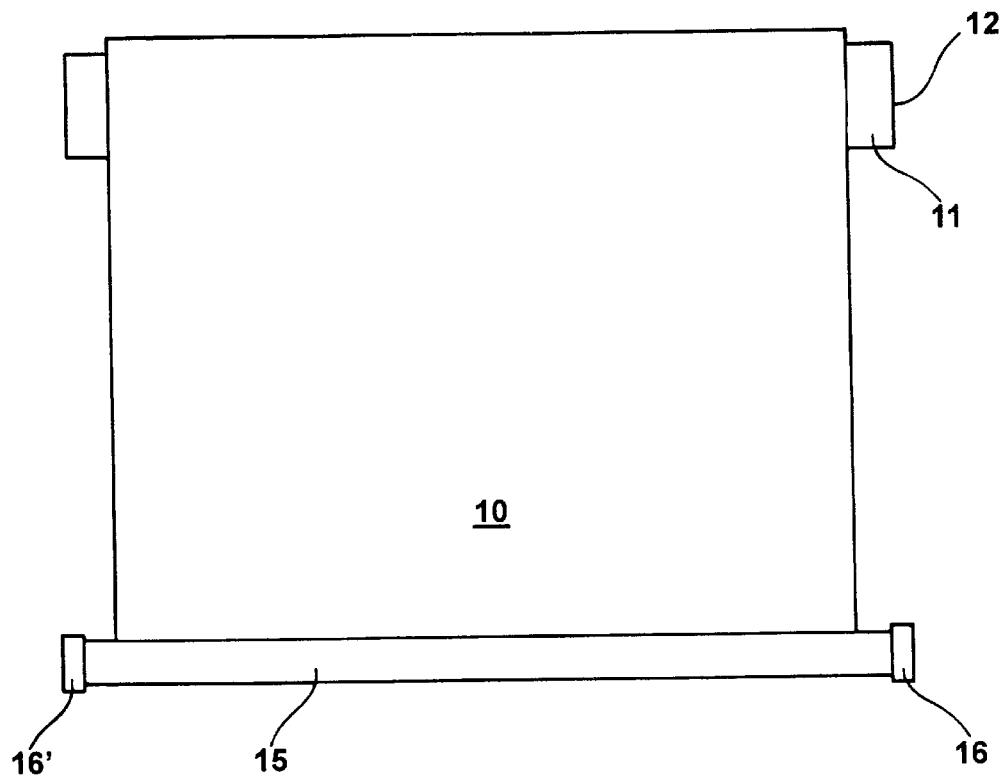
FIG. 1 is a front elevational view in the unrolled position of a conventional screen that can be rolled up.
Figure 2:
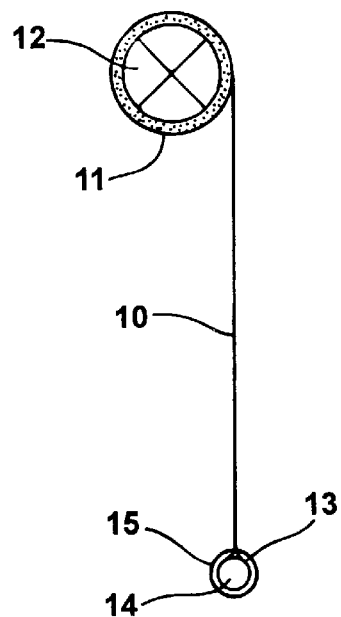
FIG. 2 is a cross-sectional view in the unrolled position of a conventional screen that can be rolled up.

A conventional retractable screen of the type that can be rolled up, such as shown in FIGS. 1 and 2, includes a band of material 10 of white color of substantially uniform width, rolled onto a roller 11, the rotation of which is controlled by a motor 12 that rotates axially. The band of material 10 has a free end 13 that is folded and fixed so as to form a hem in which a weighting bar 14 is disposed. A split tube 15 is disposed around the weighted hem. Two detachable stoppers 16 and 16' are generally provided to close the split tube 15 in order to avoid any axial displacement of the weighting bar 14 in the hem.

The motor 12 is generally of the type with adjustable end of travel, a reversing device (not shown) being provided for changing its direction of rotation. When the motor is activated, it rotates the roller 11 that rolls up or unrolls the band of material 10 according to the direction of rotation.

When the band of material 10 is unrolled, the motor 12 stops at the end of travel in a position predetermined by the adjustment. It is tensioned by the force of gravity that acts on the weighting bar 14. When the motor 12 is started again, the reversing device reverses the direction of rotation of the motor 12, that rolls up the band of material 10 around the roller 11 until activation of an end of travel device (not shown). The end of travel device is adjusted so as to interrupt the action of the motor 12 when the band of material 10 is sufficiently rolled up onto the roller 11.

The band of material 10 is generally constituted by an opaque, white material, that reflects light and makes possible its use for a projection screen for cinematographic, photographic, computer or video applications.

In applications requiring sound broadcasting that is simultaneous with the image, it is generally preferred to have a source of sound behind the screen. The sound waves emitted by the source of sound, generally a loud-speaker, pass through the band of material 10, that is generally constituted by a sheet of plastic material and perforated by a multitude of orifices provided for this purpose.

Such orifices are generally of a diameter in the range between 0.5 and 1.5 mm. Their total surface typically represents between 2% and 6% of the total surface of the screen.

This proportion of perforated surface is insufficient to permit the correct transmission of sound, a proportion of at least 40% being necessary.

A surface perforated to the extent of 40% or more of the surface of the screen is incompatible with an acceptable performance in cinematographic or video projection.

Apart from this, fabrics are known in the production of projection screens. Fabrics have the advantage, in certain textures, of being permeable to sound waves.

The disadvantage of fabrics that are sufficiently permeable to sound waves is their lack of opacity to light, which gives rise to a loss in the brightness of the projected images.

Moreover, the lack of opacity of such fabrics can give rise to the appearance of a perceptible reflection on the screen, interfering with the projected image, when a surface situated behind the screen reflects the light.

If improving the opacity of a screen made of sound-permeable fabric can be achieved by using a tighter weave, and thereby increasing its density, its permeability to sound is correspondingly reduced.

The inventor observed that, in a surprising manner, it was possible to reconcile the need for sufficient sound permeability with sufficient opacity to light by substituting a fabric of density x, insufficiently permeable to sound, by two layers joined together of density x/2 of the same fabric of which the overall permeability to sound waves turns out to be well above that of the fabric of density x.

A projection screen according to the present invention, such as shown in FIGS. 3 to 10, is free from the drawbacks and limitations mentioned above concerning conventional acoustically transparent screens that can be rolled up.

Figure 3:
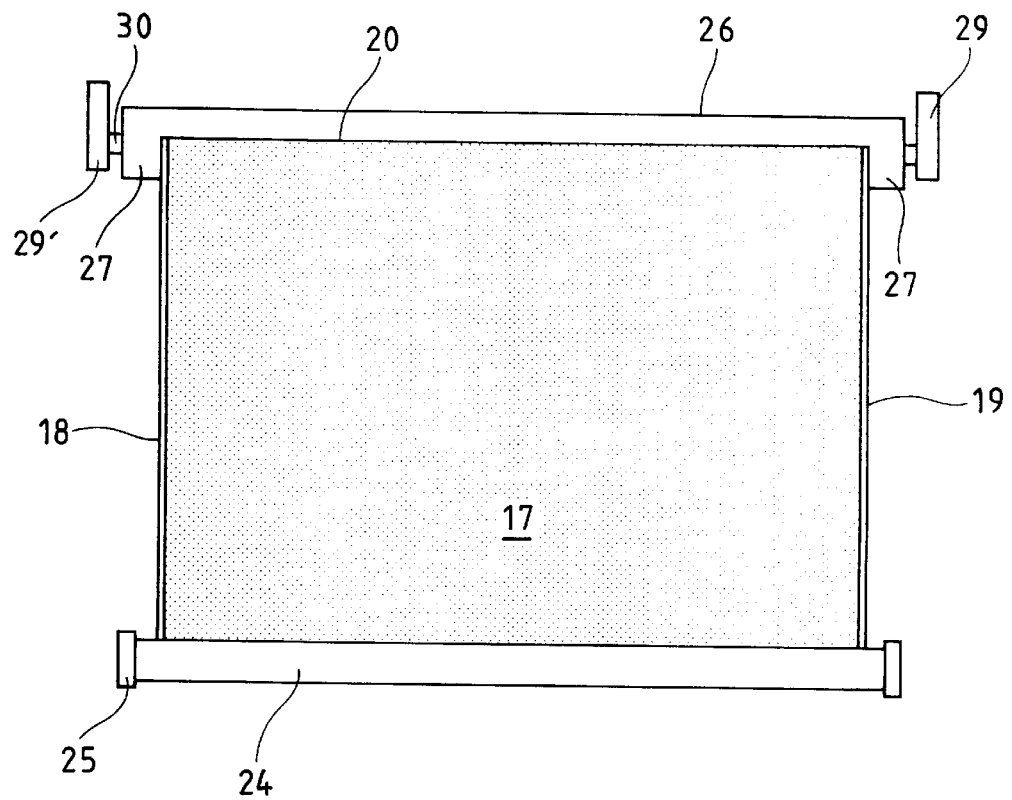
FIG. 3 is a front elevational view of a first embodiment of the present invention, the screen being in the unrolled position.
Figure 4:
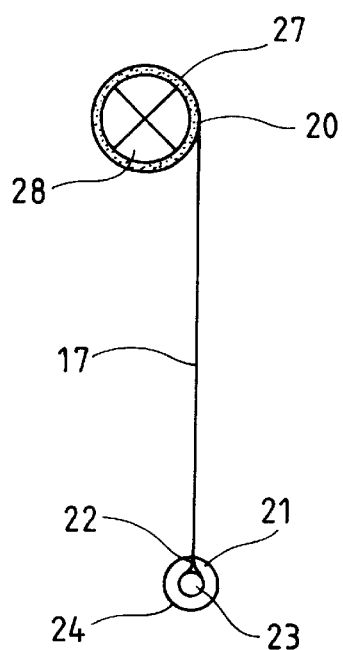
FIG. 4 is a cross-sectional view of the first embodiment of the present invention, the screen being in the unrolled position.

According to a first embodiment of the present invention, such as shown in FIGS. 3 and 4, a projection screen 17 embodies two thicknesses of an expanse of white fabric that are permeable to air. Preferably, and in a non-limiting manner, fabric is used that has 30 to 80 threads of warp, and 20 to 40 picks of weft, per square centimeter.

Preferably, and in a non-limiting manner, the mass of fabric per unit area is between 150 and 200 grams per square meter. These two thicknesses, of the same dimensions and of rectangular form, can be sewn together.

It is also possible to fold the fabric back on itself to form two thicknesses, and to sew the side edges together, as well as the two ends of the expanse of fabric.

The assembly constitutes the screen and includes two visible lateral seams 18, 19, an end 20 known as the roll-up end, and an opposite end 21 (FIG. 4) known as the weighting end.

The weighting end 21 includes, in a non-limiting manner, a hem that is open at both ends, formed in conventional manner by means of a seam 22.

A weighting bar 23, for example, a bar of solid steel, is disposed inside the hem of the weighting end 21. Preferably, the length of the weighting bar 23 is similar to that of the width of the screen 17 such that the mechanical tension due to the mass of the weighting bar 23 is evenly distributed over the width of the screen 17.

The mass of the weighting bar 23 will be proportional to the surface area of the screen 17, and preferably at least equal to 3 kilograms per square meter of screen surface area.

The maximum mass of the weighting bar 23 will be determined so as to avoid tearing of the fabric around the seam 22.

The assembly composed of the end 21 of the screen and the weighting bar 23 disposed inside the hem is itself disposed inside a rigid tube 24 that is split over the whole of its length.

Its length is at least equal to the width of the screen 17. The screen 17 is disposed so as to pass through the split in the rigid tube 24. Two stoppers 25 respectively block the ends of the rigid tube 24 to avoid axial displacement of the weighting bar 23 and/or hem 21 in the rigid tube 24.

The roll-up end 20 of the screen 17 is fixed by a suitable device to the rolling-up device that is, for example, composed of a roller 27 that is rotationally mounted to the outer face of a driving motor 28 of generally cylindrical form (represented symbolically by a cross, FIG. 4) axially disposed inside the roller 27. The motor 28 includes an axle (not shown) that is mounted to a fixed support 29 (FIG. 3).

The motor 28 is adapted to rotate the roller 27 in one direction or the other, according to the status of a motor control device (not shown). An end of travel device (not shown) is provided so as to interrupt the operation of the motor as soon as a set number of rotations has been achieved.

The end of travel device has a reversing device adapted to reverse the status of the motor control device simultaneously with the interruption of its operation.

The roller 27 has an axle 30 rotationally coupled to it, the end of which projecting axially from the roller 27 is supported by a fixed support 29', for example, a bearing.

Such drive devices are known per se, particularly in devices for automatically raising blinds, and do not constitute a feature of the invention.

When the motor control device is operated, the motor 28 rotates the roller 27 that rolls up the screen 17 onto the roller.

The weighting bar 23 simultaneously tensions the two layers of the screen 17. The rolling up of the screen onto the roller defines an inner layer and an outer layer of which the radius exceeds that of the inner layer by one thickness of fabric. For each turn rolled up, the difference in length between the two layers is thus:

$$2\pi e,$$

e being the thickness of the fabric.

The weighting bar 23 exerts, by its mass, sufficient tension to stretch the outer layer such that its elastic deformation is at least equal to the difference in length between the two layers. This avoids the formation of folds or creases by taking up the difference in length between the two layers, which folds cause visible marks on the screen and premature wear around the folds.

Moreover, by virtue of the elasticity of the fabric, the tension exerted by the weighting bar 23 takes up the possible non-elastic deformations that may arise in the different parts of the screen 17, and procures sufficient flatness for the screen in the unrolled position to allow satisfactory image projection.

Figure 7:
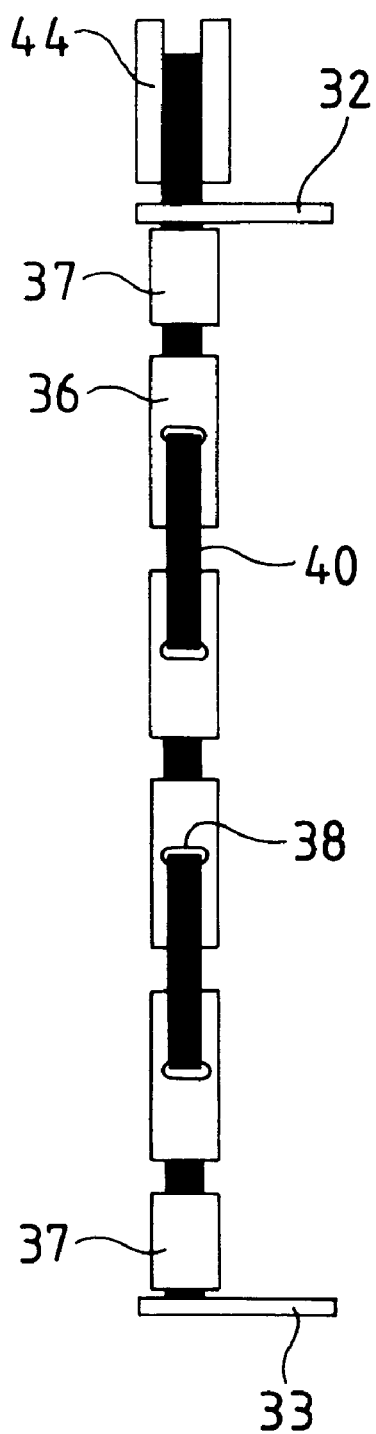
FIG. 7 shows in detail a side edge of a screen according to the second embodiment of the present invention.

A second embodiment of the present invention is shown in FIGS. 5 to 7. A screen 31 composed of two layers of fabric that are affixed by an edge termed the upper edge, using devices that are known per se, to an upper fixing bar 32 that is mounted to a frame (not shown), is illustrated.

The screen 31 is also affixed by its opposite edge, termed the lower edge, to a weighting bar 33.

Two edges 34 and 34' of the screen 31, termed lateral edges, each include a sewn hem 35 and 35', respectively.

A plurality of elements 36 that are flat, rigid and oblong (FIG. 7) and disposed in line but not joined together are provided inside each of the hems 35, 35'.

All the elements 36 are identical, and four elements 37, identical to each other and of length substantially equal to half that of an element 36, are disposed respectively at each end of the two lines of elements 36.

The elements 36 and 37 are disposed inside the hems 35, 35', and are spaced at equal intervals.

Alternatively, it is possible to connect the elements 36 and 37 together by a flexible or semi-rigid band (not shown) of width substantially equal to that of the elements 36 and 37.

The elements 36 are perforated in their center by an oblong hole 38, of which the axis is perpendicular to that of the element 36.

The hems include several oblong openings 39, sewn or riveted, which are each placed over, and correspond with, one of the respective oblong holes 38 provided in the elements 36.

Two straps 40 are provided, passing into each of the hems 35, 35' through the holes 38 and openings 39, alternating in front of and behind the screen 31.

An end termed the lower end of each strap 40 is connected to the weighting bar 33, the other end termed the upper end being fixed so as to be able to be rolled up by a rolling-up assembly 41.

Two recesses (not shown) are provided in the upper fixing bar 32 to permit movement of each strap 40 without friction when it is rolled up by the rolling-up assembly 41.

The rolling-up assembly 41 includes, in a manner similar to the previous embodiment, a roller 42 rotationally coupled to a motor 43 (represented symbolically by a cross in FIG. 5), the motor 43 being of the type with control reversal at the end of travel, as in the previous embodiment.

The roller 42 is provided with two pairs of circular guide flanges 44 disposed coaxially with the roller 42, each flange of a pair being spaced from the other by a distance equal to or greater than the width of the strap 40 plus a clearance.

The separation between the two pair of flanges 44 is equal to the separation between the two straps 40 when they are disposed in the oblong holes 38 and openings 39.

The straps 40, the rolling-up assembly 41 and the guide flanges 44 constitute a driving device adapted to actuate the folding up of the screen.

When the motor 43 rotates the roller 42, the two straps 40 roll up around the roller 42, while being guided by the guide flanges 44. This action pulls up the weighting bar 33 that folds up the screen 31 into a succession of rectangular parts 45 defined by the length of the elements 36 and 37 and by the width of the screen 31. The rectangular parts 45 are connected by folds 46 that form in the gaps separating the elements 36 from each other and also in the gaps separating the elements 36 and 37. The folds 46 are represented by gray bands in FIG. 6. The screen 31 is thus forced to fold up in a zigzag, in the manner of a road map.

The end of travel device of the motor 43 is adjusted such that, when the weighting bar 33 is at a distance from the upper fixing bar 32 substantially equal to the product of the thickness of a seam of the screen 31 containing an element 36 or 37 multiplied by the number of elements 36 and 37 disposed in a seam of the screen, the end of travel device interrupts the operation of the motor 43 and operates a reversing device (not shown) that reverses the direction of rotation of the motor the next time it is started.

Thus, when the motor 43 starts to turn once again due to the action of a control, it unwinds the straps 40. The weighting bar 33 pulls both the straps 40 and the screen 31 downwardly by gravity. The screen 31 unfolds until it is completely tensioned by the weighting bar 33.

The end of travel device of the motor 43 is adjusted so as to interrupt the operation of the motor when the straps 40 are sufficiently unwound and are no longer tensioned by the weighting bar 33, the weighting bar 33 being supported solely by the screen 31.

The end of travel device operates a reversing device (not shown), as before. Thus, the next time the motor 43 is started, the direction of rotation of the motor 43 will cause the straps 40 to be wound up.

Another embodiment utilizes a rolling-up assembly 50 (FIG. 8), similar to those already described.

A band of acoustically transparent fabric 51 adapted to reflect light is fixed by one end to the rolling-up assembly 50 that includes, in a conventional manner, a drive roller (not shown) rotationally coupled to a motor (not shown) provided with an end of travel device (not shown).

Three rollers termed lower rollers 54, 55 and 56 (FIGS. 8 and 9) are parallel to the rolling-up assembly 50 and are fixed by their ends to a support 57, their axes substantially forming an isosceles triangle with the vertex at the bottom. A first roller 54 is fixed, and a second roller 55, of which the axis defines the vertex of the triangle, is also fixed. Advantageously, the second roller is of greater diameter than the first roller.

A third roller 56, substantially of the same diameter as the first roller 54, is connected to the supports 57 in order for its axis to be able to move in a path limited by the support 57.

Elastic members (not shown) are provided to move the mobile third roller 56 toward the first roller 54. The action of the elastic members is represented by an arrow shown in FIG. 9.

The first and third rollers 54, 56, in combination with the elastic members constitute a device for pressing together the two layers of the band of fabric 51 and 51', coupled in their movement to the second roller 55.

The part 51' of the band of fabric indicates that which rises up to the rolling-up assembly 50. It is fixed at its end by a seam 52, parallel to the rolling-up assembly 50.

Figure 8:
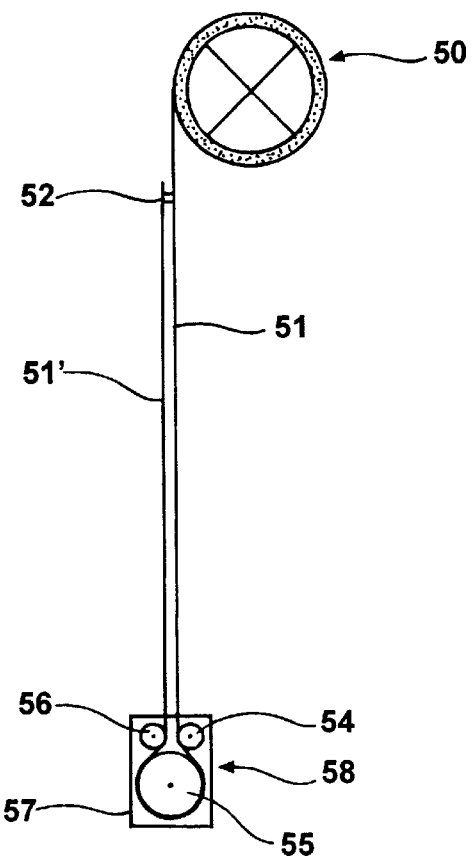
FIG. 8 is a diagrammatic view in cross section of a third embodiment of the present invention, the screen being in a partially retracted position.
Figure 9:
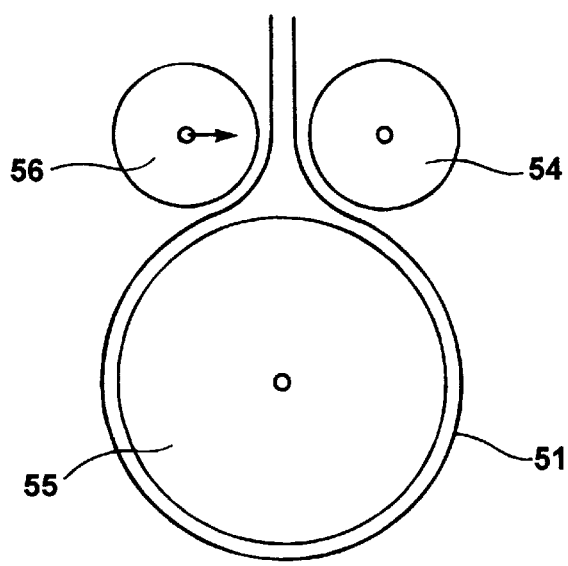
FIG. 9 is an enlarged detailed cross-sectional view of a portion of the third embodiment of the present invention depicted in FIG. 8.
Figure 10:
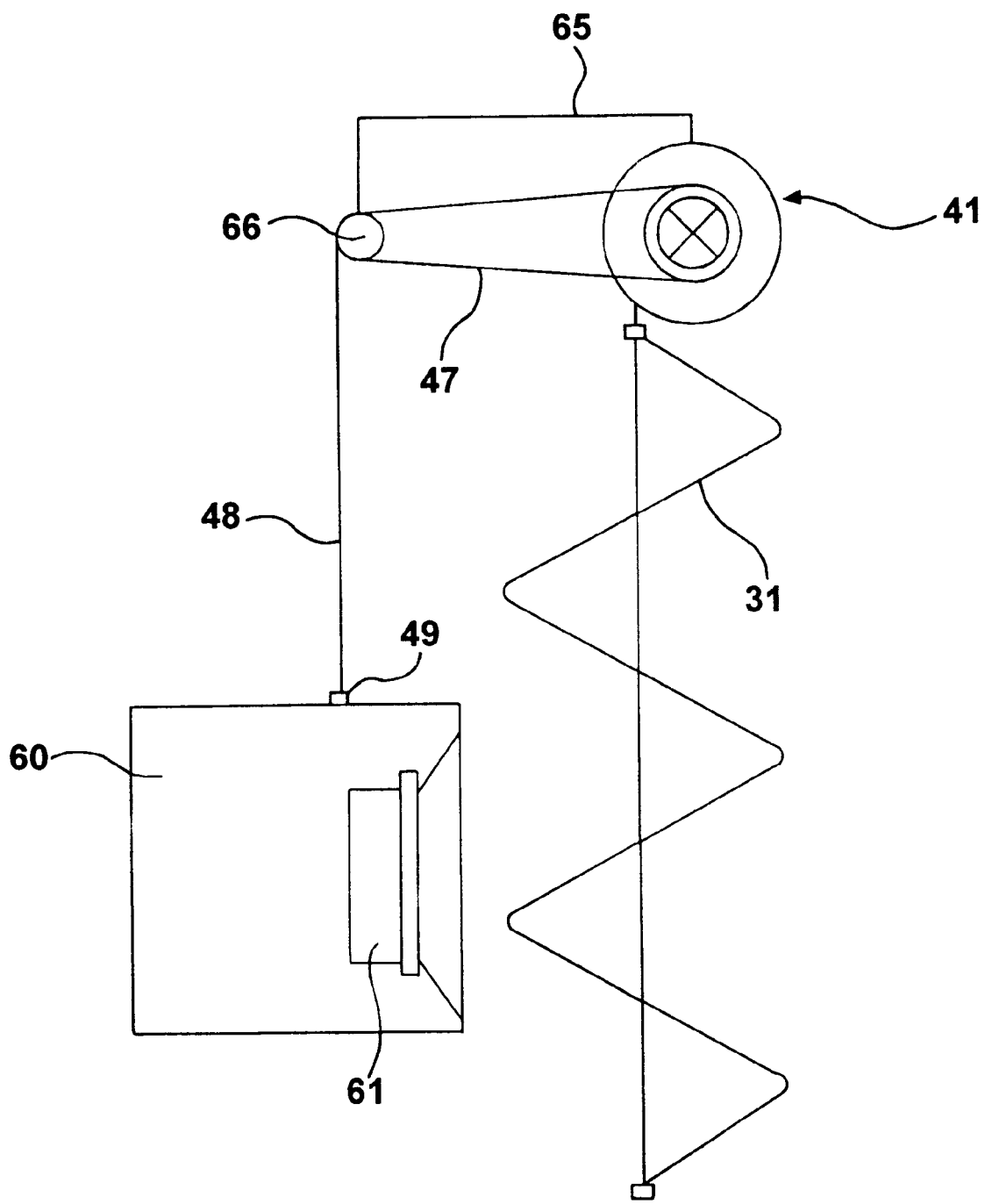
FIG. 10 is a diagrammatic side elevational view of an embodiment of the present invention associated with a retractable sound broadcasting device.

In order to visualize the two layers of the band of fabric 51 and 51', they are represented separately in FIGS. 8 and 9, but it should be understood that they are in fact joined together.

The first and third rollers 54, 56 can, in accordance with a further feature of the present invention, be replaced by any device of parallel guidance, for example permitting the band of fabric to slip.

The combination of such a guide device with elastic members moving them toward each other defines the device for pressing the two layers of the band of fabric 51 and 51' together.

The part 51' of the band of fabric is disposed so as to pass between the first and third lower rollers 54, 56, to pass around the second lower roller 55, to pass a second time between the first and third lower rollers 54 and 56, and to be fixed at its end by the seam 52 to its other part of the band of fabric 51, itself fixed to the rolling-up assembly 50.

The assembly 58 constituted by the three lower rollers 54, 55 and 56 and by their supports 57 is mobile and of sufficient mass to tension the band of fabric 51 and 51' by gravity.

When the rolling-up assembly 50 rolls up the band of fabric 51 and 51', the part that is not rolled up reduces, pulling the assembly 58 upwardly. The end of travel device provided in the rolling-up assembly 50 is adjusted so as to interrupt the action of the rolling-up assembly and to reverse it at the next control operation when the assembly 58 arrives at a predetermined position, near to the rolling-up assembly 50.

When the rolling-up assembly 50 unrolls the band of fabric 51 and 51' it is drawn downwardly and tensioned by the mass of the mobile assembly 58.

The first and third rollers 54, 56 press the two thicknesses 51 and 51' of the band of fabric against each other so as to form an acoustically transparent projection screen composed of two layers of white fabric.

A further variant of the embodiments of the present invention illustrates a fixed support 65 (FIG. 10) extending substantially horizontally behind the screen 31, and a roller 66 disposed parallel to the roller 42 supported, for example, by bearings. A drive device for rotating the roller 66 includes, for example, a transmission belt 47 that rotationally couples the roller 42 with the roller 66. Advantageously, in this case, the diameter of the roller 66 is half that of the roller 42.

Any other device for driving the roller 66 can be envisioned, of which the action is synchronized with the rotation of the roller 42.

A pair of straps 48 is fixed by one end to the roller 66, the other end being mounted by any suitable device 49 to a sound broadcasting device 60 including at least one loudspeaker 61.

Preferably the sound broadcasting device 60 has three independent acoustic units that are brought together to form a mechanically connected assembly that is adapted to be displaced vertically by the winding or unwinding of the straps 48.

When the roller 42 rolls or folds up the screen 31 (according to the embodiment of the invention), it drives around the roller 66 which winds up the strap 48, thus raising the sound broadcasting device 60.

Conversely, on extension of the screen 31, the roller 42 rotates the roller 66 in the other direction, which unwinds the straps 48, so lowering the sound broadcasting device 60 following a path that is substantially half that of the weighting bar 33.

Thus, when the screen that is permeable to sound waves is in the extended position, the sound broadcasting device 60 is located behind it substantially at mid-height.

This is the position that is most favorable to its correct operation.

The embodiments given in the present invention are non-limiting examples of the present invention that has been described above. It will be apparent to those skilled in the art that suitable modifications may be made to the invention without departing from the spirit thereof, that is defined by the claims that follow hereinafter.

What is claimed is:

1. A projection screen apparatus comprising a screen member having a roll-up end and a weighted end opposite said roll-up end; and at least two layers of material superimposed and joined together whereby said screen member is transparent to sound waves.

2. A projection screen apparatus according to claim 1 further comprising means for retracting said screen member, and wherein said screen member further comprises a weighting bar disposed within said weighted end of said screen member whereby said weighting bar elastically deforms at least one of said at least two layers of material to prevent any other layer of said at least two layers of material from creasing due to activation of said means for retracting.

3. A projection screen apparatus according to claim 1, wherein said screen member further comprises at least two laterally opposed edges and a plurality of lateral hems; a plurality of rigid oblong elements disposed within said plurality of lateral hems, said plurality of rigid oblong elements having a slot; and a weighting bar disposed within said weighted end.

4. A projection screen apparatus according to claim 3 further comprising means for retracting said screen member, said means for retracting comprising a plurality of straps, said plurality of straps each having a first end connected to said means for retracting and a second end connected to said weighting bar, said plurality of straps each being woven through said plurality of hems and through said slot of said plurality of rigid oblong elements whereby as said means for retracting is activated, said screen member is folded into a series of rectangular segments defined by said plurality of rigid oblong elements.

5. A projection screen apparatus according to claim 1 further comprising: a plurality of fixed rollers disposed within said weighted end of said screen member; a mobile roller for compressing said at least two layers of material; and means for compressing said at least two layers.

6. A projection screen apparatus according to claim 5, wherein said means for compressing further comprises at least two parallel guide means fixed to said mobile roller.

7. A projection screen apparatus according to claim 6 further comprising: a sound broadcasting device disposed in a direction away from said screen member; and means for lowering and raising said sound broadcasting device whereby said lowering and raising means act simultaneously with extension and retraction respectively of said screen member.

8. A projection screen apparatus according to claim 1, wherein said at least two layers of material are composed of white fabric comprising 30 to 80 threads of warp, and 20 to 40 picks of weft, per square centimeter.

9. A projection screen apparatus comprising:
a screen member having a roll-up end; a weighted end opposite said roll-up end; and at least two layers of white fabric that are superimposed and joined together whereby said screen member is transparent to sound waves;
a sound broadcasting device disposed in a direction away from said screen member; and
means for retracting said screen member.

10. A projection screen apparatus according to claim 9, wherein said screen member further comprises a weighting bar disposed within said weighted end of said screen member whereby said weighting bar elastically deforms at least one of said at least two layers of white fabric to prevent creasing any of said at least two layers of white fabric during activation of said means for retracting.

11. A projection screen apparatus according to claim 9, wherein said screen member further has at least two laterally opposed edges and a plurality of lateral hems; a plurality of rigid oblong elements disposed within said plurality of hems, each of said plurality of rigid oblong elements further having a slot; and a weighting bar disposed within said weighted end.

12. A projection screen apparatus according to claim 11, wherein said means for retracting said screen member further comprises a plurality of straps, said plurality of straps each having a first end connected to said means for retracting and a second end connected to said weighting bar, said plurality of straps each being woven through each said plurality of hems and through said slot of said plurality of rigid oblong elements whereby as said means for retracting is activated, said screen member is folded into a series of rectangular segments defined by said plurality of rigid oblong elements.

13. A projection screen apparatus according to claim 9, wherein said means for retracting said screen member further comprises a fixed roller; a mobile roller; and means for pressing together said at least two layers of white fabric.

14. A projection screen apparatus according to claim 13, wherein said means for pressing further comprises at least two parallel guide means fixed to said mobile roller.

15. A projection screen apparatus according to claim 9, wherein said at least two layers of white fabric are composed of white fabric comprising 30 to 80 threads of warp, and 20 to 40 picks of weft, per square centimeter.

* * * * *